June 22, 1943. W. E. SMALL 2,322,705
SHUTTER STRUCTURE
Filed Oct. 10, 1941 3 Sheets-Sheet 3
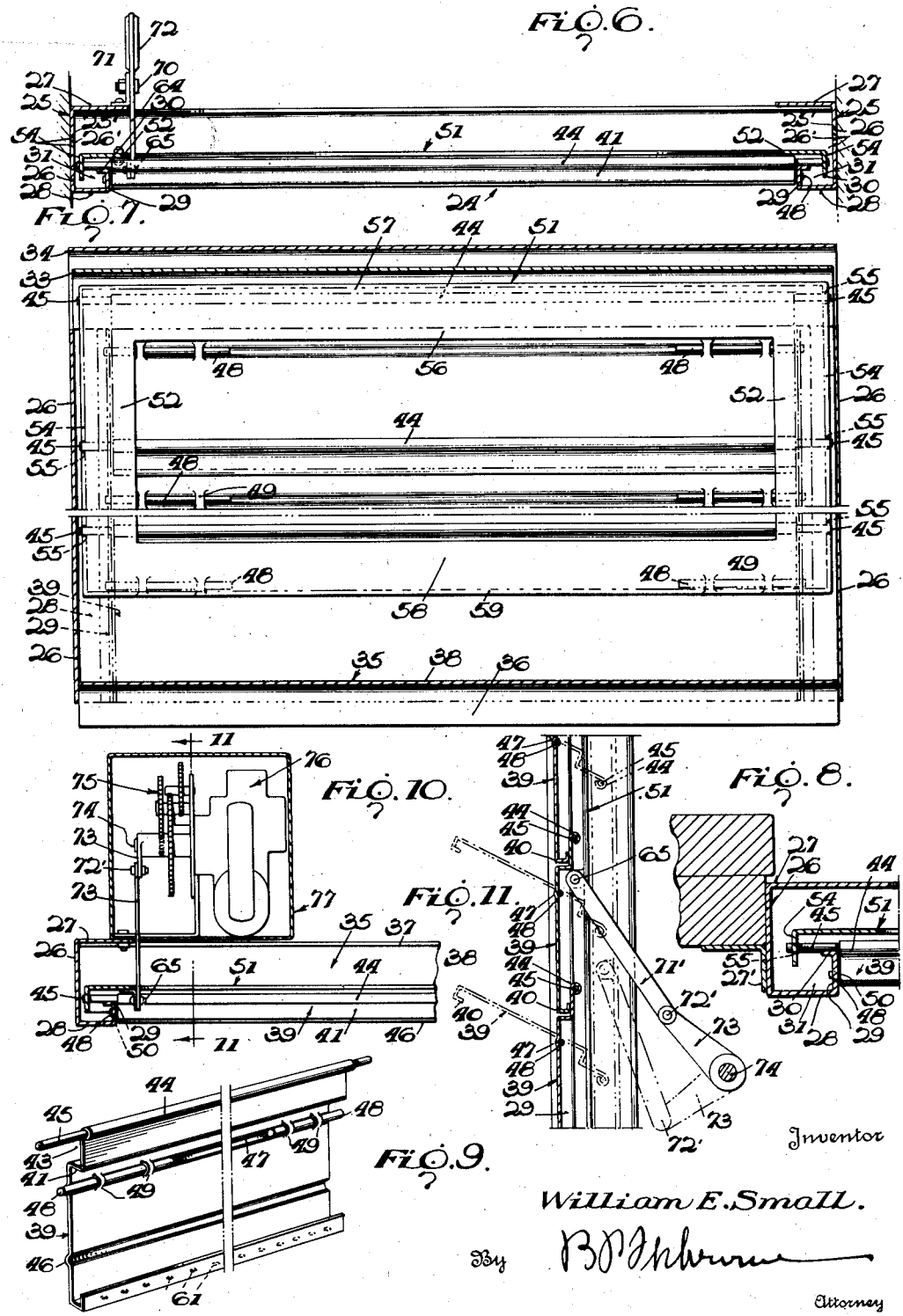
Inventor
William E. Small.
By B. P. Fishburne
Attorney Patented June 22, 1943

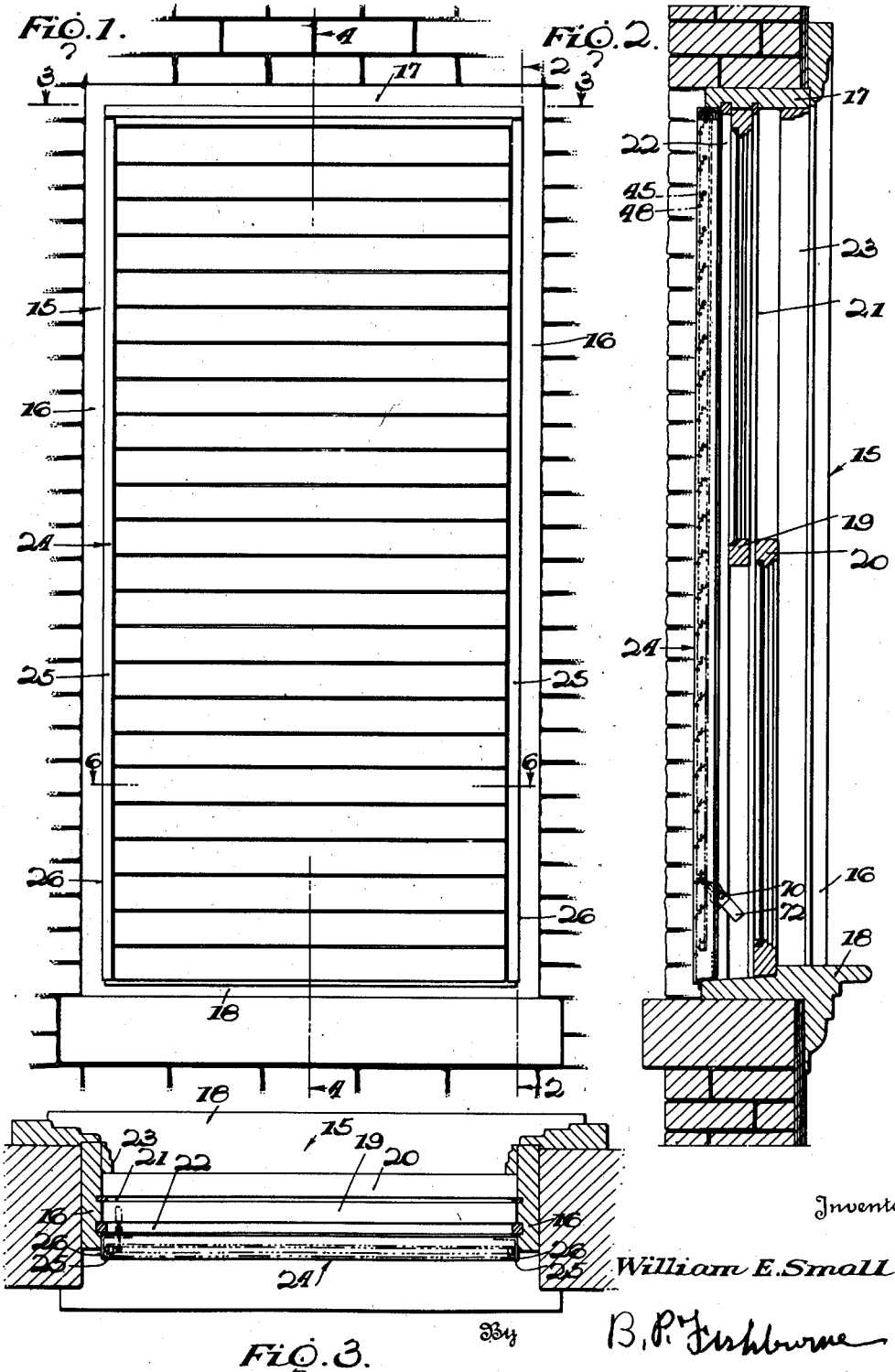

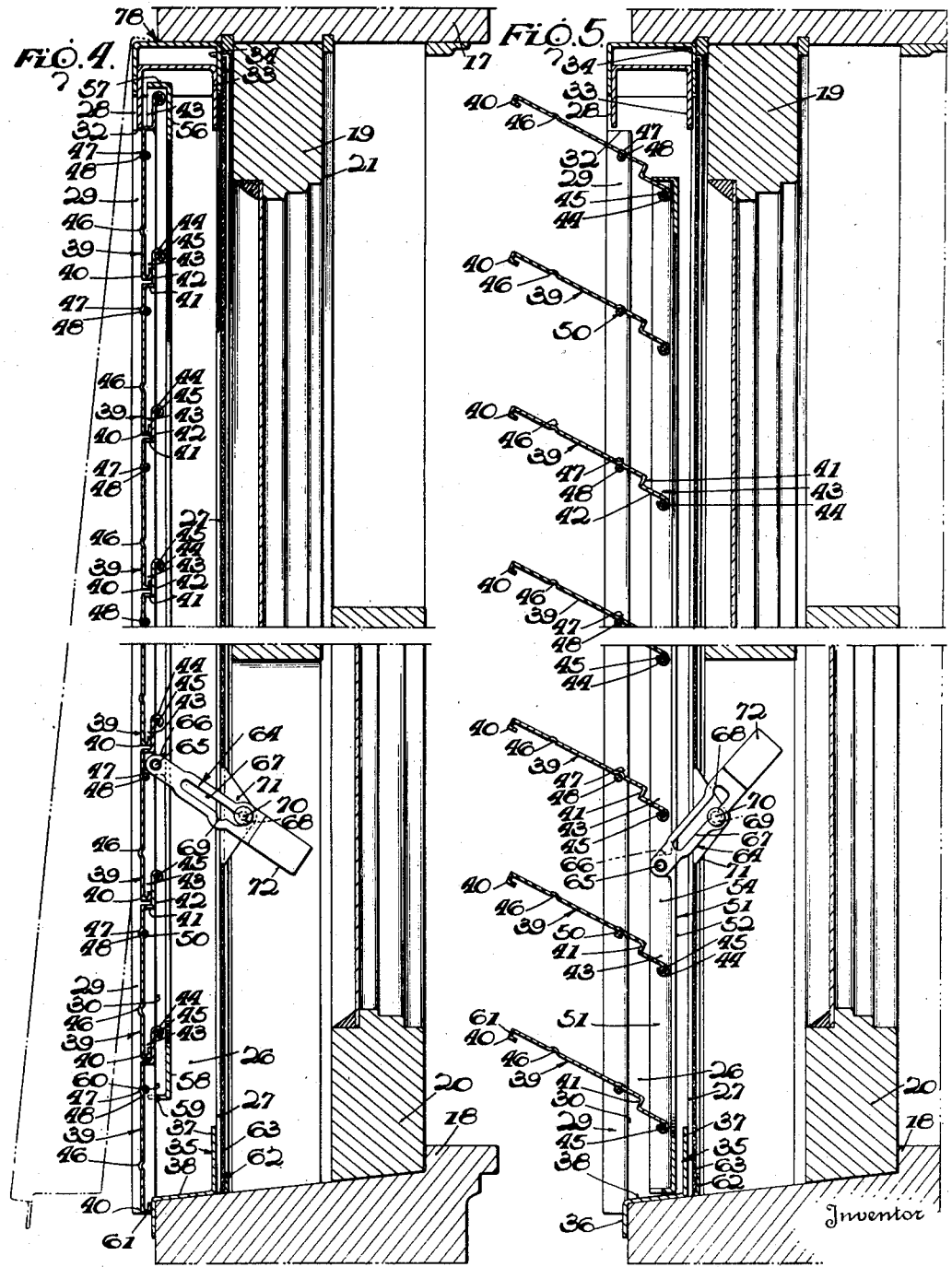

2,322,705

UNITED STATES PATENT OFFICE 2,322,705

SHUTTER STRUCTURE

William E. Small, Miami, Fla., assignor of one-third to Lyle Bishop, Miami, Fla., and one-third to Thomas B. Lehon, Chicago, Ill.

Application October 10, 1941, Serial No. 414,520

7 Claims. (Cl. 189—62)

My invention relates to a shutter structure.

An important object of the invention is to provide a shutter structure which is adapted for exterior use and will effectively exclude rain, wind, or light.

A further object of the invention is to provide a shutter structure which will effectively prevent the escape of light to the exterior from a room or the like, whereby the device is effective for black-out purposes.

A futher object of the invention is to provide a shutter structure which will serve as a protection, to a considerable extent, against flying shrapnel, debris, or rifle fire.

A further object of the invention is to provide a shutter structure so constructed that the operating means for the louvers are disposed entirely upon the inner sides of the louvers.

A further object of the invention is to provide a shutter structure having the louvers and operating means arranged within an outer rigid unitary metal frame included in the shutter structure, whereby the shutter structure as such may be shipped without the necessity of crating the same.

A further object of the invention is to provide a floating frame for operating the louvers and which is connected with the opposite ends of the louvers and which will serve to substantially balance the pivoted louvers so that they may be shifted by the minimum applied force.

A further object of the invention is to provide a shutter structure wherein the floating frame which moves the louvers overlaps the ends of the louvers and the outer frame, while spaced from parts of the outer frame, thus positively preventing the passage of light about the ends of the louvers.

A further object of the invention is to so construct the outer frame and the floating frame so that they properly coact with the louvers to positively prevent the passage of rain or water about the ends of the louvers and outer frame.

A further object of the invention is to so construct the outer frame and floating frame so that parts thereof interfit, effecting a compact organization, while stiffening the outer frame and floating frame to render them rigid.

A further object of the invention is to so construct the louvers that they may be made of relatively light sheet metal, to reduce their weight and to impart to the same proper strength or stiffness and to cause the same to lie in a common plane when closed.

A further object of the invention is to provide a shutter structure having louvers which will permit of a maximum amount of light entering a room or the like.

A further object of the invention is to provide a shutter structure which may be conveniently and quickly installed in a window frame, and having its lower end adapted to be shifted outwardly, when desired.

A further object of the invention is to provide means, manual or power operated, to operate the floating frame.

Other objects and advantages of the invention will be apparent during the course of the following description.

In the accompanying drawings forming a part of this application and in which like numerals are employed to designate like parts throughout the same, Figure 1 is an outer side elevation of a shutter structure embodying my invention, Figure 2 is a vertical transverse section taken on line 2—2 of Figure 1, Figure 3 is a horizontal section taken on line 3—3 of Figure 1, Figure 4 is a vertical transverse section taken on line 4—4 of Figure 1.

Figure 5 is a similar view with the louvers shifted to the open position,

Figure 6 is a horizontal transverse section taken on line 6—6 of Figure 1,

Figure 7 is an inner side elevation of the louver structure, parts broken away,

Figure 8 is a detailed section through the vertical side of the outer casing, similar to Figure 6, showing an added attaching strip, Figure 9 is a perspective view of one of the louvers removed, parts broken away, Figure 10 is a plan view of power operated means for moving the floating frame, and, Figure 11 is a vertical section taken on line 11—11 of Figure 10, parts in elevation.

In the drawings, wherein for the purpose of illustration is shown a preferred embodiment of my invention, the numeral 15 designates a window frame as a whole, including side jambs 16, a top jamb 17, and a sill 18. 19 and 20 designate the upper and lower sashes and 21 the parting strip, 22 the outer stop strip, and 23 the inner stop strip. This is the conventional window structure.

My shutter structure comprises an outer stationary rigid frame 24, formed of metal, such as sheet metal. All parts of this frame are preferably permanently rigidly connected. This rigid frame includes sides 25 which are generally U- shaped or channel-shaped in cross-section. Each side comprises an outer rigid edge-web 26 bent at its outer edge to provide an outer rigid side-web 27. The edge-web 26 is bent at its inner edge to provide an inner rigid side-web 28, and this inner side-web is again bent inwardly at a right angle providing a rigid flange 29 having a stiffening flange 30 formed upon its outer edge and extending into the space 31 between the webs 26 and 29. The construction imparts to the sides 25 the maximum stiffness or rigidity. The web 27 extends laterally and inwardly beyond the web 28, as shown. The webs 27 and 28 extend to the upper end of the frame, but the webs 29 terminate at elevations 32, beneath and spaced from the upper ends of the webs 27 and 28. A rigid top end 33 formed of sheet metal and which is inverted U-shaped or channel-shaped in cross-section is inserted into the upper ends of the sides 25, and may be rigidly secured thereto by welding or the like. The numeral 34 designates a top sheet metal adapter which is inverted U-shaped or channel-shaped in cross-section and this adapter is adjustably mounted upon the transverse top 33, and its outer faces are flush with the outer faces of the webs 25, 27, and 28. If desired, the adapter may be dispensed with and the frame made in the precise length to properly fit the window frame. The numeral 35 designates a rigid bottom or sill end of the stationary frame, formed of sheet metal and made L-shaped in cross-section and carrying a depending flange 36. The sill end 35 is arranged within the lower end of the frame 25 and its inner wall 37 is welded to the webs 27 while its bottom wall 38 may be welded to the edge-webs 26. It is thus seen that a strong rigid outer stationary frame is provided, all parts of which are formed of metal and which is unitary in the sense that all parts are permanently secured together, and the sides and top of the frame are hollow or channeled to receive and house elements to be described. An adapter may be applied to one side of the frame, if desired, so that it will fit windows of different widths. Openings 25' may be formed in the edge-webs 26, to receive screws 26', for securing the frame 25 in place within the window frame. The screws 26' may be omitted and an angle-strip 27' secured to the edge-webs 26 and the strip 27' secured to the window frame, as shown in Figure 8.

The shutter structure further comprises a plurality of louvers 39, preferably formed of sheet metal. It is preferred that the gauge of this sheet metal be lighter than the gauge of the sheet metal included in the stationary frame. Since each louver is preferably formed of light gauge sheet metal they are properly stiffened and reinforced, and for this purpose, at its outer longitudinal edge, each louver has its material bent inwardly upon itself forming an open stiffening flange 40, U-shaped in cross-section, which extends for a substantial distance inwardly beyond the inner face of the louver. Each louver is provided at a point near and spaced from its inner longitudinal edge with an inwardly bent shoulder 41, arranged at a right angle thereto, providing an inwardly off-set inner marginal strip 42. This affords a pocket 43 outwardly of and adjacent to the shoulder 41 and marginal strip 42, to receive the inwardly projecting stiffening flange or rib 40 at the outer longitudinal edge of the companion louver. This permits of the several louvers, when in the closed position, lying flat in a common plane, and the adjacent marginal edges of the louvers have a substantial overlapping relation so that rain, wind, or the like cannot pass such marginal edges. The marginal portion 42 of each louver has its inner edge bent into a bead or loop 44, facing inwardly, and these beads receive pivot elements 45, which may be welded to the beads, or held therein by frictional engagement. There may be two pivot elements 45 extending into the opposite ends of the bead 44 or the pivot element may be continuous and may extend throughout the entire length of the bead and project outwardly beyond the bead. Each louver 39 is preferably provided with longitudinally extending outwardly bulging reinforcing ribs 46 and 47, which serve to stiffen and reinforce the louver. Pivot elements 48 are disposed upon the inner side of the louver and arranged within the recess of the rib 47 and are soldered or welded to the louver, as shown at 49. The pivot elements extend outwardly beyond the ends of the louvers and are pivotally mounted within openings 50 formed in the webs 29. The pivot elements 48 project longitudinally beyond the webs 29 and are arranged to engage with the flanges 30, as shown.

The numeral 51 designates a rigid floating frame, as a whole, all parts of which are formed of metal and which is arranged entirely within the outer stationary frame 25 and upon the inner sides of the louvers. This rigid floating frame is formed of metal and may be formed from rigid angle iron. The floating frame includes vertical rigid sides, each of which includes a rigid web 52 disposed in the plane of the floating frame and an outwardly facing rigid web 54, formed or bent at a right angle thereto, and facing outwardly. The rigid web 54 has openings 55 to pivotally receive the pivot elements 45. The rigid floating frame further comprises a top including a rigid web 56 in the plane of the webs 52 and carrying a forwardly bent rigid web 57, at a right angle thereto. The frame further comprises a rigid bottom including a rigid web 58 in the plane of the webs 52 and provided at its lower end with a rigid web 59, extending forwardly at a right angle thereto. The web 59 is cut back to the line 60, to provide suitable clearance for the webs 29 and the lowermost louver, whereby the several louvers may be properly shifted to the vertical closed position. The lowermost louver is provided in the bottom wall of the flange 40 with weep holes 61.

If desired, a metal screen frame 62 may be arranged inwardly of the main frame 25 and within the outer stop strip 22 and this frame will carry screening 63. The frame 62 may be attached to the frame 25, if desired.

Manually operated means is provided to move the floating frame, comprising a lever 64, pivotally connected at 65 with a bracket 66 rigidly attached to the side of the floating frame. This lever has an elongated slot 67 and notches 68 and 69. A friction bolt or hinge 70 is provided, extending through the slot 67 and rigidly attached to a bracket 71 in turn rigidly mounted upon the side of the frame 25. If desired, the friction bolt could be provided with a thumb-nut. The lever 64 is provided at its inner end with a handle 72. The bolt 70 is adapted to engage the walls of the slot 67 and by swinging the inner end of the lever 64 downwardly the floating frame 51 will be raised whereby the louvers will be closed. This will position the notch 68 in alignment with the bolt 70 and the lever 67 may then be shifted laterally so that the notch 68 will receive the bolt 70. This will lock the lever against swinging movement until the lever is manipulated so that the bolt is out of the notch 68. When the inner end of the lever is swung upwardly the floating frame 51 is swung downwardly and the louvers are opened and the louvers may be locked in the open position by swinging the raised lever laterally so that the notch 69 will receive the friction bolt 70.

I also contemplate using power means to open and close the louvers. To accomplish this, a link 71' is substituted for the lever 64 and this link is secured to the pivot 65. The link 71' is pivoted at 72' with a crank 73, Figures 10 and 11, and this crank is turned by a shaft 74, which may be driven through a train of gears 75, in turn driven by an electric motor 76. This motor 76 may be mounted in a housing 77 arranged upon the inner side of the stationary frame 25 and mounted thereon. The advantage of the motor driven means to actuate the louvers is that the louvers of a plurality of shutter structures could be simultaneously closed or opened by the pushing of a button or the closing of a switch. This would be advantageous in buildings when it was desirous of effecting a black-out.

As clearly shown in Figures 4 and 5, the shutter structure is arranged within the window frame exteriorly of the sashes. If desired, the frame 25 could be hinged at its top at the point 78, which would permit of the lower end of the louver structure being swung outwardly, for cleaning the window sill or the like, as is frequently done with storm sashes, screens, etc. In view of the foregoing description it is apparent that the floating frame 51 is mounted inwardly of the louvers and this floating frame together with the louvers, when the louvers are closed are all disposed within the limits of the outer frame 25. This enables the outer frame to serve as a crate for the louvers and the operating parts so that the shutter structure may be shipped without the necessity of individually crating each shutter structure. The arrangement reduces the thickness of the shutter structure to the minimum whereby economy in space, for some purposes is effected. For this purpose, the bracket 71 and the levers 64 or the power operated means, may be applied in position after shipment. When the louvers are in the closed position, Figure 4, their marginal edges overlap effecting a tight joint to prevent the passage of rain, wind, or the like, and all louvers assume a vertical position in a common plane. This produces a neat, flat, and attractive appearance and increases the strength of the structure and renders it more difficult for the louvers to be improperly opened from the exterior, as there are no inclined overlapping edges between which a tool may be readily inserted for prying the louvers apart. When in the closed position the louvers form a considerable protection against flying shrapnel, debris, or the like, or even rifle fire. Particular attention is called to the fact that by arranging the floating frame 50 inwardly or rearwardly of the louvers, the webs 52 of the vertical sides of the floating frame overlap the meeting ends of the louvers and the webs 29, Figure 8, thereby positively preventing the passage of light between these elements when the floating frame is in the raised or closed position. The webs 52 thus prevent any rain which may beat in around the ends of the louvers passing directly past the shutter structure, and the webs 54 will stop any rain which may beat in past the ends of the louvers and impinge upon the webs 52, from passing beyond the outer edges of the webs 52. The webs 54 will guide this rain or water downwardly and discharge the same upon the bottom web 38. The webs 29 and 54 overlap, when the louvers are closed, and the flanges 30 not only stiffen the webs 29 but afford a wide flat surface against which the pivot elements 45 rest when the louvers are closed. The webs 54 are rigid and are permanently spaced laterally from the flanges 30 and webs 29, and hence the free movement of the floating frame is maintained. When the louvers are completely opened the floating frame 51 will rest upon the bottom web 38. The pivot elements 48 are positioned much nearer the inner edges of the louvers than the outer edges and as a result of this the outer portions of the louvers, upon the outer sides of the pivot elements 48 are much heavier than the inner portions of the louvers. The combined weight of the floating frame 51 and the inner portions of the louvers 39 and pivot elements 45 are substantially equal to the combined weight of the outer portions of the louvers, whereby the louvers are substantially balanced and there will be very little, if any, tendency for the louvers to turn upon their pivots, due to the action of gravity. As a result of this, very little force is necessary to move the louvers upon their pivots, to open or close them. As before stated, the louvers when closed are arranged in a common vertical plane, producing a flat appearance, which is compact and neat and the arrangement will also positively prevent to the maximum extent, the passage of rain, due to the driving action of the rain, between and beyond the overlapping marginal portions of the louvers. Furthermore, the louvers cannot be readily improperly opened from the exterior by the insertion of a tool, such as a knife blade, which may be readily done if the louvers have inclined overlapping portions. A further advantage of my construction is that the louvers may be shifted to an open position, above the horizontal, whereby they will be angularly disposed to reflect the maximum amount of light in the room. It is thus seen that all parts of the shutter structure are formed of metal, and that there are few and simple parts.

It is to be understood that the form of my invention herewith shown and described is to be taken as a preferred example of the same and that various changes in the shape, size, and arrangement of parts may be resorted to without departing from the spirit of my invention or the scope of the subjoined claims.

Having thus described my invention, what I claim is:

1. In a shutter structure, an outer rigid frame formed entirely of metal and of channel formation, a plurality of louvers pivotally mounted upon the outer portion of the frame to turn upon substantially horizontal longitudinal axes, a vertically movable rigid metal frame including sides and a top and bottom connecting the sides and mounted within the channel of the outer frame and disposed upon the inner side of the louvers and pivotally connected with the louvers near their inner longitudinal edges, and means to move the vertically movable frame.

2. In a shutter structure, a rigid outer frame formed entirely of metal and comprising upstanding sides which are generally U-shaped in horizontal cross-section, each outer side including an edge-web, an inner side-web and an outer side-web spaced from the inner side-web, a plurality of louvers arranged within the space between the outer side-webs and pivotally connected with the outer side-webs so that they may turn upon substantially horizontal longitudinal axes, an upstanding operating frame including sides and a top and bottom connecting the sides mounted within the sides of the outer frame, said sides overlapping the substantially meeting ends of the louvers and the outer webs, means for pivotally connecting the sides of the operating frame with the louvers near their ends, and means to move the operating frame.

3. In a shutter structure, an outer rigid frame formed entirely of metal and comprising upstanding sides which are generally U-shaped in horizontal cross-section, each outer side including an edge-web, an inner side-web and an outer side-web spaced from the inner side-web, the outer side-web being provided at its inner edge with a laterally extending flange extending toward the iner side-web, the flange being provided at its free edge with a stiffening rib extending toward the edge-web, the flange being spaced from the edge-web to form a cavity, the flanges being provided with vertically spaced sets of openings, louvers arranged between the flanges and provided with substantially horizontal pivot elements adjacent to their ends which are mounted within the openings, a vertically movable frame mounted within the cavity of the sides of the stationary frame and including sides and a top and bottom connecting the last named sides, said last named sides having rigid webs disposed within the plane of the vertically movable frame, the last named webs being provided with laterally projecting rigid webs extending toward the outer side-webs of the stationary frame, the outwardly projecting rigid webs of the vertically movable frame having openings formed therein and being adapted for movement into the cavity between the flange and edge-web of the side of the outer frame and permanently spaced from said flange and edge-web, pivot elements carried by the louvers and extending into the openings of the outwardly projecting rigid webs, and means to move the vertically movable frame.

4. In a shutter structure, an outer rigid frame formed entirely of metal and having its parts permanently secured together and comprising upstanding hollow sides, each side including a rigid edge-web and a rigid outer side-web, the outer side-web being provided at its inner edge with a rigid flange disposed at substantially a right angle to the outer side-web and extending toward the inner side of the frame, the flange and spaced edge-web forming a cavity, louvers arranged between the flanges and having substantially horizontal pivots engaging the flanges, a vertically movable frame mounted for movement within the limits of the edge-webs and disposed upon the inner side of the louvers, the vertically movable frame including sides and a top and bottom connecting the sides, said sides having main rigid webs which are arranged in the plane of the vertically movable frame, the main rigid webs overlapping the ends of the louvers and the flanges, the main rigid webs of the vertically movable frame being provided at their outer edges with laterally extending rigid stiffening webs projecting outwardly toward the outer side-webs, the outwardly projecting rigid stiffening webs being adapted to be arranged outwardly of and in overlapping relation with the flanges and permanently spaced from the flanges, pivot elements secured to the ends of the louvers and engaging the outwardly projecting stiffening webs, and means to move the vertically movable frame.

5. In a shutter structure, an outer frame, horizontal louvers for the outer frame, each louver being formed of sheet metal and having its outer longitudinal edge bent inwardly upon itself for providing an open stiffening flange which is generally U-shaped in cross-section, said generally U-shaped flange having a bottom wall disposed at substantially a right angle to the louver and an inner wall disposed in a plane substantially parallel with the plane of the louver, the bottom wall having openings formed therein for the draining of water, each louver being provided near and spaced from its inner longitudinal edge with an inwardly projecting shoulder disposed at substantially a right angle thereto and forming an inwardly off-set marginal portion leading to the inner edge of the louver, the inwardly off-set marginal portion being disposed in a plane substantially parallel with the louver, the marginal portion forming with the shoulder a pocket, each louver being provided with longitudinal outwardly bulging stiffening ribs, pivot elements arranged upon the inner side of the louver and mounted within the recess of one outwardly bulging rib, said pivot elements engaging the outer frame, a vertically movable frame pivotally connected with the louvers adjacent to the inner edges of the inwardly off-set marginal portions, the arrangement being such that the louvers overlap when closed and the outer edges of the louvers having the open flanges enter the pockets produced by the marginal portion and shoulders.

6. In a shutter structure, a rigid outer frame formed entirely of metal and including upstanding sides which are generally U-shaped in horizontal cross-section, louvers arranged within the outer frame, substantially horizontal pivot means connecting each louver with the upstanding sides and arranged nearer one longitudinal edge of the louver so that the louver is unbalanced with respect to turning action upon its pivot means, and a rigid floating frame mounted within said outer frame and pivotally connected with the ends of each louver adjacent to the longitudinal edge which is nearer the pivot means of the louver, the weight of the rigid floating frame being such that it substantially balances all of the louvers with respect to turning upon their pivot means, the rigid floating frame including upstanding rigid sides arranged substantially within the upstanding rigid sides of the outer frame, and a transverse member connecting the sides of the floating frame the upstanding rigid sides of the rigid frame overlapping the substantially meeting ends of the louvers and parts of the upstanding sides of the outer frame to prevent the passage of light about the ends of the louvers, the upstanding rigid sides of the rigid floating frame being permanently free from frictional engagement with the upstanding sides of the outer frame which frictional engagement would overcome the floating action of the floating structure.

7. In a shutter structure, a rigid outer frame formed entirely of metal and including upstanding rigid sides which are generally U-shaped in horizontal cross-section, a plurality of louvers arranged between the upstanding sides, substantially horizontal pivot means connecting each louver with the upstanding outer sides and arranged nearer one longitudinal edge of the louver so that the louver is unbalanced with respect to turning action upon its pivot, a rigid floating frame mounted within the outer frame and including a top and bottom and upstanding rigid sides pivotally connected with the ends of each louver adjacent to the longitudinal edge of the louver which is nearer the pivot means of the louver, the weight of the floating frame being such that it substantially balances all of the louvers with respect to the turning movement upon their pivot means, the upstanding rigid sides of the floating frame including webs arranged in the plane of the floating structure and overlapping the substantially meeting ends of the louvers and parts of the upstanding rigid sides of the outer frame to prevent the passage of light about the ends of the louvers, said upstanding rigid sides of the floating frame also including webs disposed at substantially a right angle to the first named webs and projecting outwardly beyond the first named webs, the outwardly projecting webs being arranged within the upstanding rigid sides of the outer frame and serving to prevent the passage of rain or the like beyond such outwardly projecting webs, the outwardly projecting webs being permanently spaced from the walls of the upstanding rigid sides of the outer frame so that the floating action of the floating frame is maintained.

WILLIAM E. SMALL.